May 14, 1968  J. R. JOHNSON  3,383,483
INSPECTING WIDE MOUTH GLASS CONTAINERS FOR SPIKES
Filed June 8, 1966  4 Sheets-Sheet 1

INVENTOR.
JOHN R. JOHNSON
BY J. R. Nelson and
D. T. Innis
ATTORNEYS

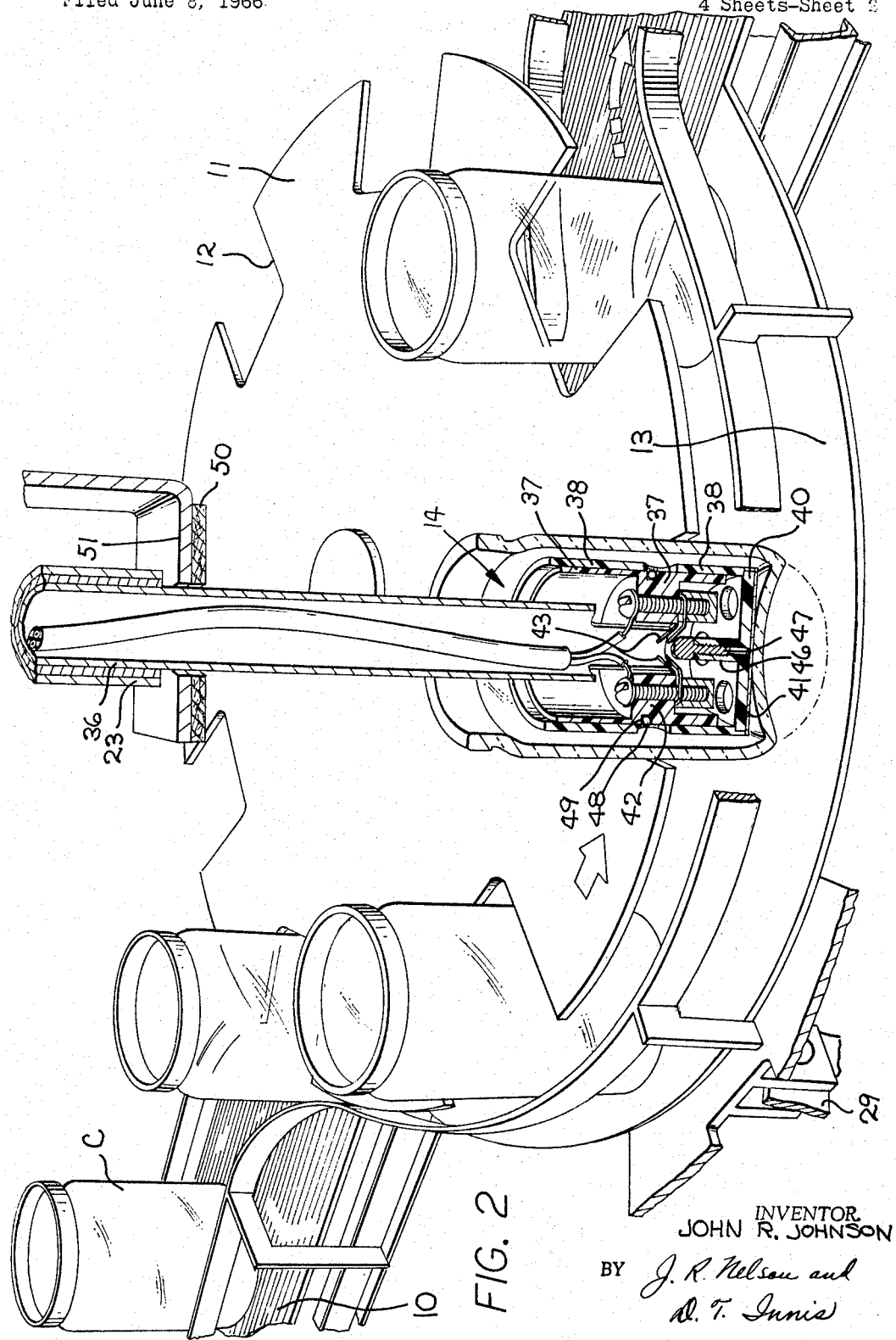

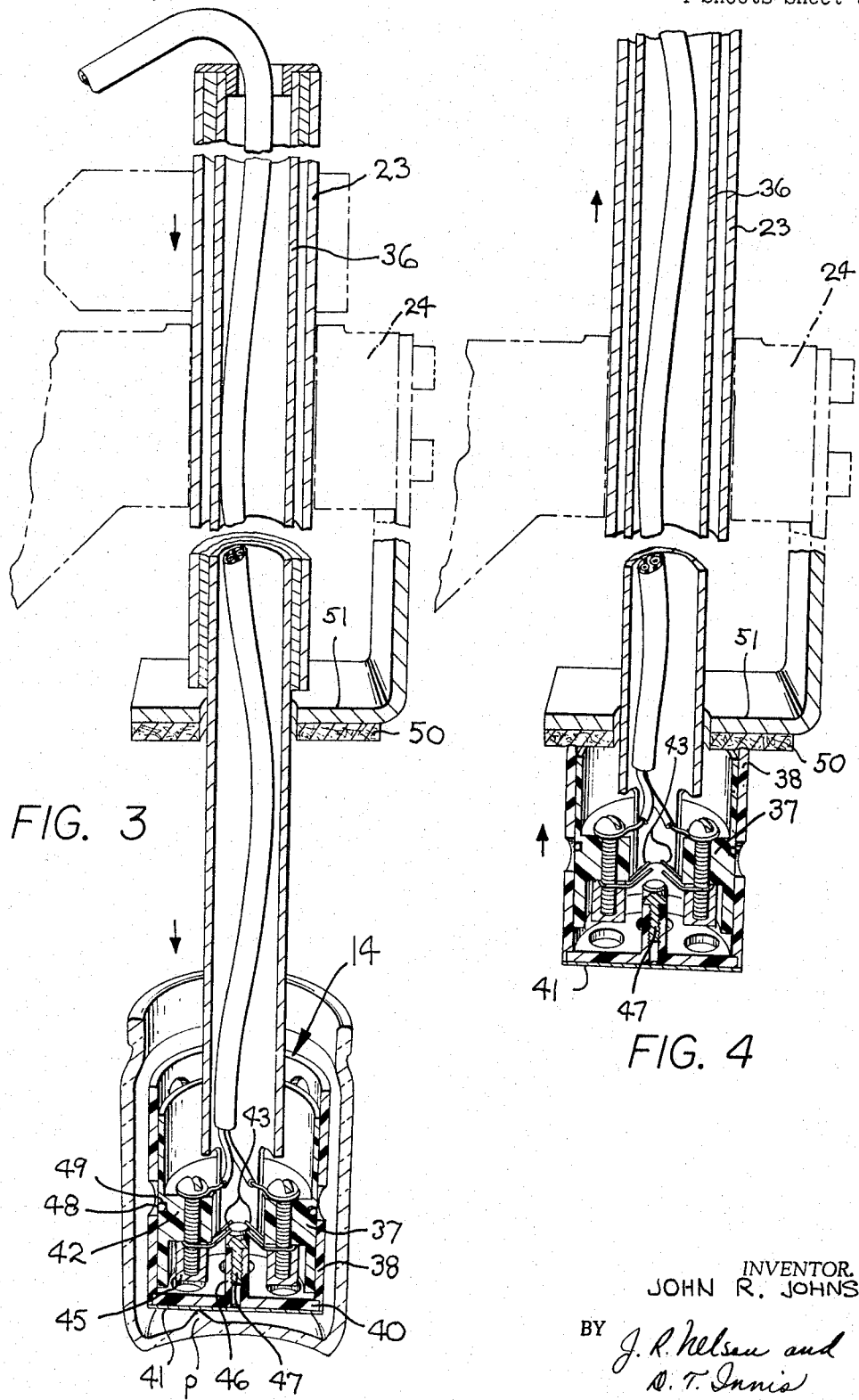

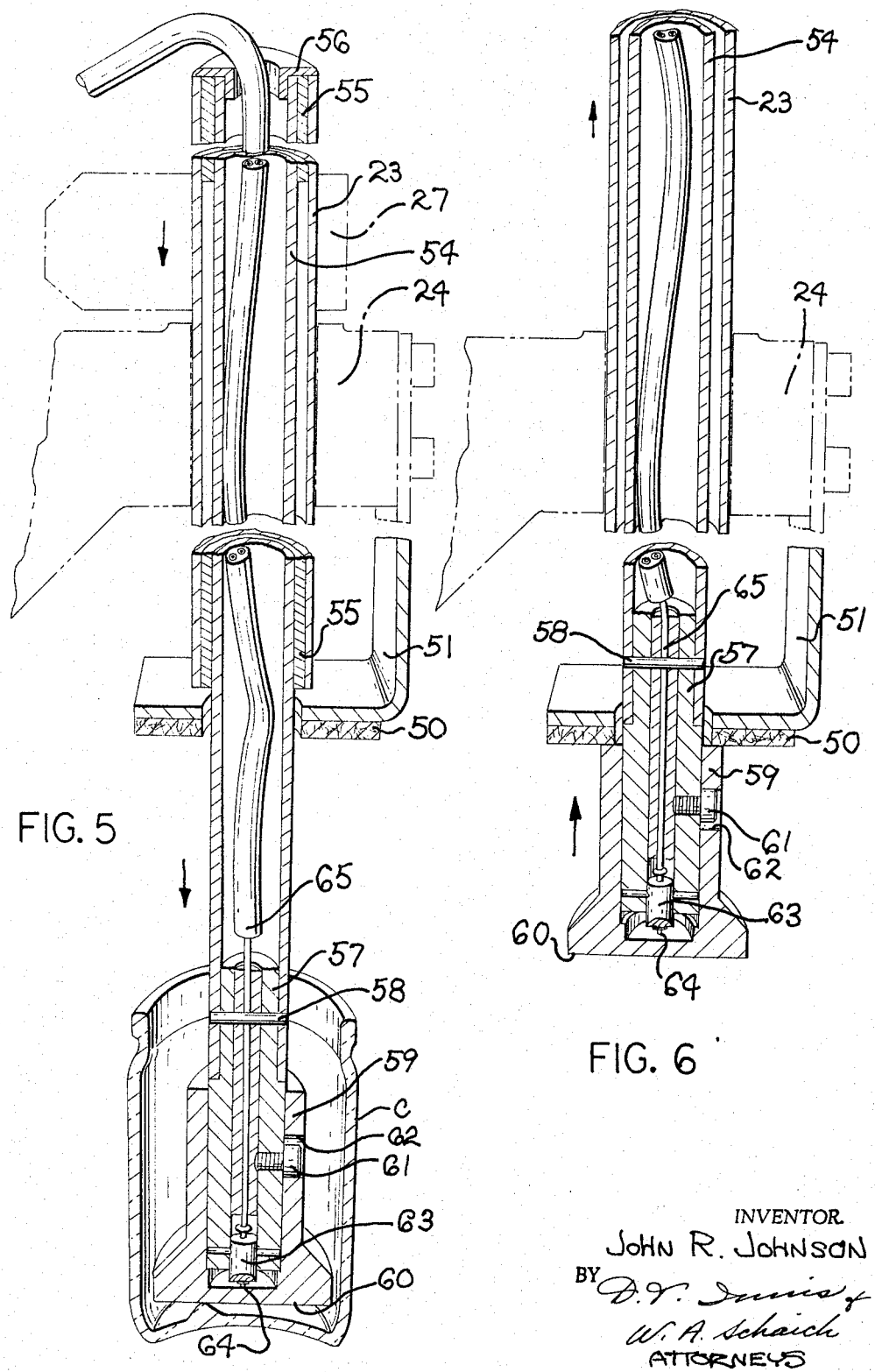

United States Patent Office 3,383,483
Patented May 14, 1968

3,383,483
INSPECTING WIDE MOUTH GLASS CONTAINERS FOR SPIKES
John R. Johnson, Toledo, Ohio, assignor to Owens-Illinois, Inc., a corporation of Ohio
Continuation-in-part of application Ser. No. 498,448, Oct. 20, 1965. This application June 8, 1966, Ser. No. 594,950
21 Claims. (Cl. 200—61.42)

ABSTRACT OF THE DISCLOSURE

Apparatus for inspecting wide mouth containers for "spike" defects by the movement of a lightweight member through the open mouth of the container. The lightweight member is reciprocated in the container by a support member whose lowermost position is predetermined by the lightweight contact member, upon contacting a "spike," will be moved upwardly relative to the supporting member. Switch means are provided to be actuated by the upward, relative movement of the contact member with respect to the supporting member.

---

This application is a continuation-in-part of applicant's copending application Ser. No. 498,448, filed Oct. 20, 1965, and now abandoned.

This invention relates to inspecting wide mouth glass containers for spikes and similar projections in the bottom wall thereof.

In the manufacture of wide mouth glass containers, a defect that occasionally occurs comprises a projection of thin glass that extends upwardly from the bottom wall and is commonly called a spike. It is of course essential to detect such defects and reject the containers. One of the problems inherent in inspecting for such spikes is that they tend to break very easily and thus are not easily inspected by any known physical contact method of inspection.

It is therefore an object of the invention to provide an apparatus for inspecting wide mouth glass containers for spikes in a mechanical contact manner which is efficient, quick and utilizes a minimum number of parts.

Basically, the apparatus comprises a body member which is movable downwardly into the open mouth of the container and supports a lightweight contact member. When the lightweight contact member engages the spike, it is moved axially upwardly relative to the body member and completes a circuit to produce a reject signal. One embodiment utilizes the principle of friction means provided between the contact member and the body member to maintain the relative positions therebetween in a readily displaceable fashion. A second embodiment of the apparatus of the invention utilizes the principle of the contact member being mounted to the body member for limited free relative movement with respect to each other.

In the drawings:

FIG. 2 is a part sectional perspective view on an enlarged scale of the apparatus shown in FIG. 1;

FIG. 3 is a part sectional perspective view of the inspection portion of the apparatus showing the parts in a different operative position;

FIG. 4 is a view similar to FIG. 3 showing the parts in still another operative position;

FIG. 5 is a part sectional, perspective view of a second embodiment of the inspection head of the invention in inspecting position; and FIG. 6 is a view similar to FIG. 5 showing the head of the second embodiment in a retracted position.

Figure 1:
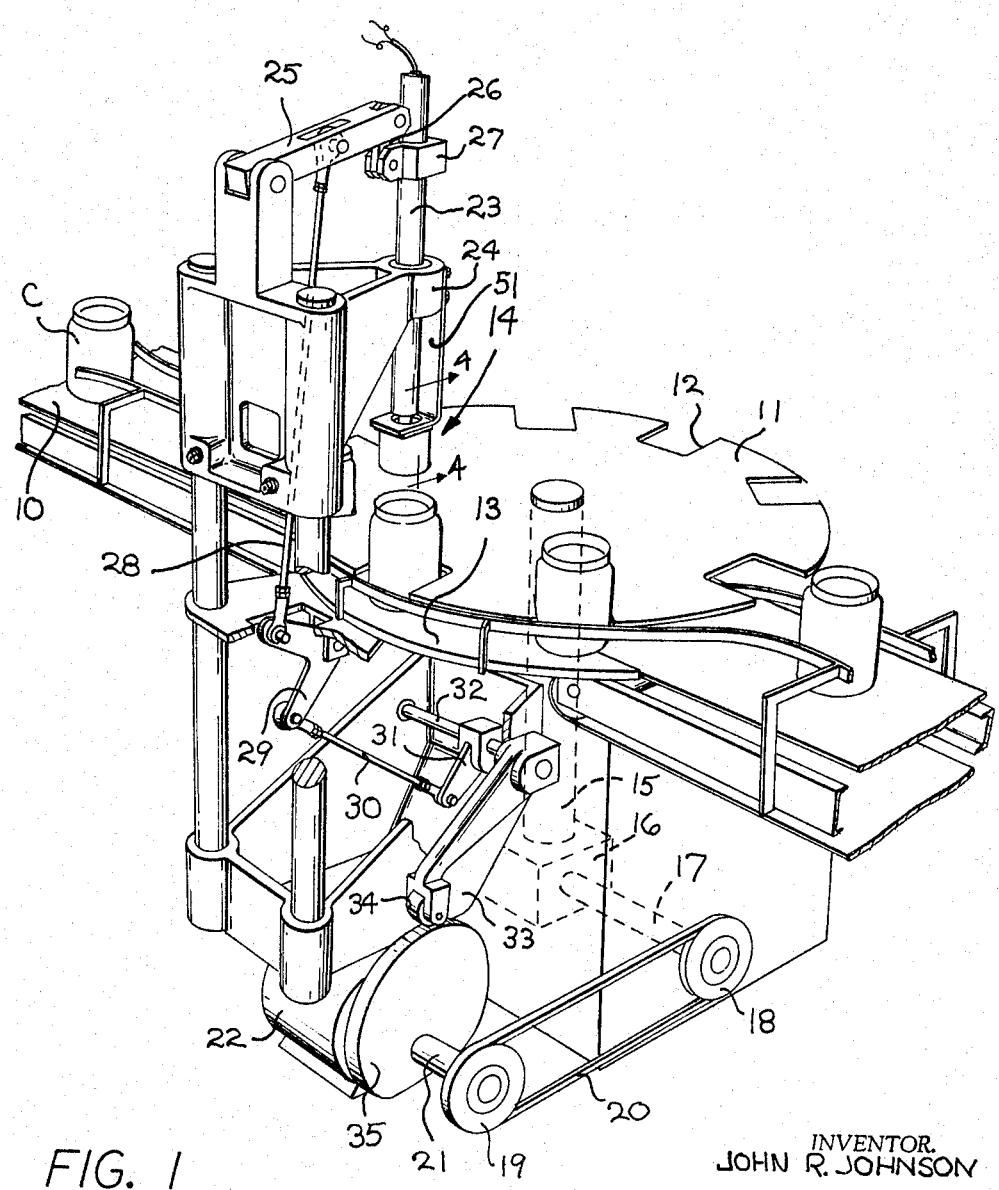
FIG. 1 is a fragmentary perspective view of an apparatus embodying the invention.

Referring to FIG. 1, the apparatus embodying the invention comprises an endless conveyor 10 that successively brings wide mouth glass containers C which are to be inspected to a star wheel 11 that has pockets 12 on the periphery thereof which receive the containers C and move them across a contact plate 13 through an inspection station. At the inspection station, a spike inspecting head 14 is moved downwardly into the open mouth of the container. If a spike is detected, as presently described, a reject signal is produced that is adapted to reject the container after it is returned to the conveyor 10 and carried to a reject station.

As shown in FIG. 1, the star wheel 11 is mounted on a shaft 15 that is driven through a gear box 16, shaft 17, pulleys 18, 19 and belt 20, shaft 21 and a motor 22. The gear box 16 is adapted to move the star wheel 11 in intermittent fashion so that each container is maintained at the inspection station for a predetermined interval of time. During this interval, the spike inspecting head 14 is moved downwardly and upwardly into the container. This movement is achieved by mounting the spike inspecting head 14 on a tube 23 that is movable upwardly and downwardly in a support bracket 24. A lever 25 is pivoted at one end to an inter-connecting link 26 that extends to a secondary bracket 27 fixed to the tube 23. A rod 28 extends between the lever 25 and one end of a bell crank 29 that is pivoted to the frame of the machine. A second rod 30 extends between the other end of the bell crank 29 and the lever 31 on a shaft 32. The shaft 32 supports a cam follower arm 33 that has a roller 34 which engages a cam 35 on the shaft 21 of the motor 22. As the motor 22 is rotated, the cam 35 is also rotated causing the cam follower 33 and the inter-connecting linkage to move the tube 23 and, in turn, the spike inspecting head 14 downwardly and upwardly into and out of the open mouth of the container in timed relation to the intermittent movement of the star wheel 11.

Referring to FIGS. 2, 3 and 4, the tube 23 in turn supports, by way of sleeve bearings 55, an internal tube 36 that extends downwardly. The tube 36 is provided at its top end with a flanged cap 56 adapted to seat on the upper end of the tube 23. The spike inspecting head 14 is mounted on the internal tube 36. The spike inspecting head 14 includes a body 37 that is made of lightweight material such as plastic, for example, nylon. A sleeve 38 forming a contact member is telescoped over the body member 37 and is also made of lightweight material such as plastic, for example, nylon. Sleeve 38 is provided with a plurality of openings 39 in the periphery thereof to further reduce the weight for reasons presently described. The sleeve member 38 includes a bottom wall 40 which has a lightweight hard surface formed by a metal sheet 41.

The body 37 includes a laterally extending shoulder or ring 42 intermediate its ends that supports spaced electrical contacts 43 that are held in position by screws 44 and nuts 45. A pin 46 extends upwardly from the bottom wall 40 of the sleeve member 38 and supports an electrically conductive contact member 47.

The sleeve 38 is held in relatively fixed frictional relation to the body 37 by an annular spring 48 that is provided in a groove 49 in the sleeve. In this fashion, the sleeve is held on the body with a light force so that it is readily displaceable axially relative to the body.

As a container C is brought to the inspection station by star wheel 11 and the tube 23 is lowered, the spike inspecting head 14 is moved downwardly within the container as shown in FIG. 2. If no spike or similar projection is present, the sleeve 38 is not displaced vertically relative to the body 37 so that the electrical contact member 47 remains out of contact with the spaced contacts 43.

If, however, a projection or spike P is present, the hard sheet 41 on the sleeve 38 engages the spike P thereby interrupting the downward movement of the sleeve 38. Continued downward movement of the body 37 causes the contacts 43 to engage the electrically conductive contact 47 and complete a circuit to produce the reject signal.

Upon movement of the tube 23 upwardly, the upper end of the sleeve 38 engages a pad 50 of a reset member 51 fixed on the bracket 24 to move the sleeve 38 downwardly relative to the body member 37 and thereby reset the sleeve 38 and, in turn, contact 47 relative to the contacts 43 for another inspecting cycle.

In the event a container, or other object which will not accommodate the head 14, enters the inspection station and the head can move downwardly only a short distance, the tube 36 will be displaced upwardly within the tube 23. Also, the switch 43 will be actuated. In this way the inspection apparatus is protected from damage due to mechanical interference with the reciprocation of the device.

Referring to FIG. 3, since the sleeve 38 is made of very lightweight material and is held with a very small force with respect to the body 37 it is readily movable by engagement with a spike P, so that detection of the spike is insured. Even if the spike is very thin so that it is broken after the sleeve 38 is displaced, rejection is assured because the sleeve 38 is retained frictionally in its newly displaced position relative to the body member 37 by the friction spring 48 in groove 49.

Referring now to FIGS. 5 and 6, the second embodiment of the inspection head of the invention will be described, keeping in mind that the mechanical means for reciprocating the head is essentially identical to that described above with respect to FIGS. 1–4.

The tube 23 is reciprocated by the secondary bracket 27 and guided in the support bracket 24. A tube 54, similar to tube 36 of FIGS. 1–4, is coaxially mounted within the tube 23 and normally moves in unison therewith. However, as explained above, in the event the tube 54 is prevented from moving into a bottle because of jamming or interference, the tube 54 may slide upwardly in the tube 23 and thus prevent any serious damage to the gauging head.

The lower end of the tube 54 has a cylindrical body member 57 connected thereto by a pin 58. The body member 57 is of substantially the same diameter as the tube 54 to facilitate disassembly and removal from the supporting tube 23. The body member telescopically receives a lightweight cylindrical sleeve member 59 having a bottom contacting surface 60. The member 59 is preferably formed of a lightweight metal, such as, aluminum or magnesium. It should be understood that the member 59 is freely slidable with respect to the body member 57 except that it is limited in its relative movement by a screw 61 fixed to the member 57 and having its head positioned within a vertical slot 62 formed in the side wall of the member 59. The slot 62 is of sufficient height so as to permit the free movement of member 59 to the extent necessary to close a micro-switch 63 carried by the member 57. The micro-switch 63 has a downwardly extending actuating plunger 64, which is contacted by the inside surface of the member 59 upon relative displacement with respect to member 57. The micro-switch is electrically connected to the conductor 65 which extends axially through the tube 54.

With the apparatus of FIGS. 5 and 6, it can be seen that when a spike is touched by the member 59 during its downward movement a signal will be initiated by the closing of the micro-switch 63. Upon retraction of the inspecting head the member 59 will move down under its own weight, and, in the event the member 59 becomes lodged in its "up" or switch closing position, it will be moved "down" when it contacts the undersurface of member 50, in the same manner as the resetting of the inspection head in the first embodiment.

Other and further embodiments may be resorted to within the spirit and scope of the appended claims.

I claim:
1. In an apparatus for inspecting wide mouth glass containers for spikes, the combination comprising
  a body member,
  means supporting said body member for movement into and out of the open mouth of a glass container to a predetermined depth,
  a contact member formed of a relatively thin lightweight material,
  said contact member telescopically received on said body member for relative movement,
  said contact member is initially retained in a predetermined down position below said body member and when the body member is moved downwardly within the open mouth of a glass container and the contact member engages the spike, said contact member is readily displaced upwardly relative to said body member,
  signal means operable upon upward displacement of said contact member relative to said body member for producing a reject signal, and if no spike is present said contact member is not displaced and no signal is given

2. The combination set forth in claim 1 wherein said means for mounting said contact member on said body member includes friction means for holding said contact member with a light force in any predetermined position.

3. The combination set forth in claim 1 including means positioned above said body member and responsive to the withdrawal of the body member from said container for resetting the position of the contact member relative to the body member.

4. In an apparatus for inspecting wide mouth glass containers for spikes, the combination comprising
  a body member,
  means mounting said body member for movement into and out of the open mouth of the glass container to a predetermined depth,
  a sleeve member formed of a relatively thin lightweight material telescoped on said body member and having a bottom contacting surface,
  friction means interposed between the sleeve member and the body member tending to maintain the relative position therebetween such that when the body member is moved downwardly within the open mouth of a container and the contacting surface of the sleeve member engages a spike, the sleeve is displaced upwardly relative to the body member,
  and electrical contact means operable by displacement of the sleeve member upwardly relative to the body member for producing a reject signal.

5. The combination set forth in claim 4 wherein said friction means comprises a groove in one of said members and an annular friction member in said groove and engaging the other of said members.

6. The combination set forth in claim 4 wherein said body member and said sleeve member are made of plastic.

7. The combination set forth in claim 6 including a rigid metal contact plate overlying the contact surface of said sleeve.

8. The combination set forth in claim 4 wherein said sleeve includes perforations in the side thereof.

9. The combination set forth in claim 4 wherein said means for mounting said body member for movement comprises a tube,
  said electrical contact members being mounted on said body member and having electrical leads extending through said tube.

10. In an apparatus for inspecting wide mouth glass containers for spikes, the combination comprising means moving containers successively into and out of an inspection station, and an inspecting head at said inspection station comprising a body member, means supporting said body member for movement downwardly into and out of the open mouth of a glass container to a predetermined depth, a contact member formed of a relatively thin lightweight material, said contact member telescopically received on said body member for relative movement, said contact member is held in a predetermined down position relative to said body member with a light force whereby when the body member is moved downwardly within the open mouth of a glass container and the contact member engages the spike, said contact member is readily displaced upward relative to said body member, and signal means operable upon upward displacement of said contact member relative to said body member for producing a reject signal.

11. The combination set forth in claim 10 wherein said means for mounting said contact member on said body member includes friction means interposed between said body member and said contact member.

12. The combination set forth in claim 10 including means positioned above said body member and responsive to the withdrawal of the body member from said container for resetting the position of the contact member relative to the body member.

13. In an apparatus for inspecting wide mouth glass containers for spikes, the combination comprising means supporting and moving the glass containers successively into and out of an inspection station, and an inspecting head at said inspection station comprising a cylindrical body member, means mounting said body member at said inspection station for movement into and out of the open mouth of the glass container to a predetermined depth, a cylindrical sleeve member formed of a relatively thin lightweight material telescoped on said body member and having a bottom contacting surface, friction means interposed between the sleeve member and the body member tending to maintain the relative position therebetween such that when the body member is moved downwardly within hte open mouth of a container and the contacting surface of the sleeve member engages a spike, the sleeve is displaced upwardly relative to the body member, and electrical contact means on said body member operable by displacement of the sleeve upwardly relative to the body member for producing a reject signal.

14. The combination set forth in claim 13 wherein said body member and said sleeve member are made of plastic.

15. The combination set forth in claim 14 wherein said sleeve includes perforations in the side thereof.

16. The combination set forth in claim 14 including a metal contact plate overlying the contact surface of said sleeve.

17. An inspecting head for inspecting wide mouth glass containers for spikes comprising a body member, a cylindrical sleeve member formed of a relatively thin lightweight material telescoped on said body member and having a bottom contacting surface, means interposed between the sleeve member and the body member tending to maintain the relative position therebetween such that when the body member is moved downwardly within the open mouth of a container to a predetermined depth and the contacting surface of the sleeve member engages a spike, the sleeve is displaced upwardly relative to the body member, an electrical contact means on said body member operable by displacement of the sleeve upwardly relative to the body member for producing a reject signal.

18. The combination set forth in claim 17 wherein said means interposed between the sleeve member and body member comprises a groove in one of said members and an annular friction member in said groove and engaging the other of said members.

19. The combination set forth in claim 17 wherein said means for mounting said body member for movement comprises a tube, and said electrical contact members have electrical leads extending through said tube.

20. The combination set forth in claim 17 wherein said body member and said sleeve member are made of plastic.

21. The combination set forth in claim 17 wherein said means interposed between the sleeve members and the body member comprises a vertically elongated slot formed in one member and a radially extending pin fixed to the other member and riding in said slot.

References Cited

UNITED STATES PATENTS

| | | | |
|---|---|---|---|
| 2,320,863 | 6/1943 | Green | 200—61.42 X |
| 2,352,091 | 6/1944 | Fedorchak et al. | 200—178 |
| 2,571,161 | 10/1951 | Poole | 33—178 |
| 2,596,342 | 5/1952 | McNutt et al. | 33—178 |
| 3,261,934 | 7/1966 | Kisling | 200—61.42 |
| 3,355,811 | 12/1967 | Tailleur | 209—75 XR |
| 2,578,573 | 12/1951 | Mills | 209—88 |
| 2,582,494 | 1/1952 | Lorenz | 209—88 |

BERNARD A. GILHEANY, *Primary Examiner.*

H. B. GILSON, *Assistant Examiner.*